Patented Nov. 1, 1949

2,486,993

UNITED STATES PATENT OFFICE 2,486,993

REACTION PRODUCTS OF ORGANOSILICON COMPOUNDS AND ESTERS OF HYDROXY ACIDS AND METHOD FOR THEIR PRODUCTION

Frank J. Sowa, Cranford, N. J.

No Drawing. Application January 10, 1947, Serial No. 721,478

8 Claims. (Cl. 260—78.3)

This invention relates to useful products obtained by the reaction of various organosilicon compounds and esters of hydroxy acids, and to a method for the production thereof.

The objects of this invention are briefly as follows:

1. To prepare by the reaction of certain classes of organosilicon compounds and various esters of hydroxy acids materials which are useful as plasticizers and as ingredients in baking finishes.

2. To provide a method for the preparation of reaction products having the aforementioned properties.

These and other objects are accomplished in accordance with the method of this invention by contacting at reaction temperatures an alkyl ester of lactic acid or tartaric acid and an organosilicon compound having the generic formula $R_ySiX_z$, in which R is an alkyl radical, X is a halogen atom or an alkoxy group, $y$ is one or two, and $z$ is two or three, the fourth silicon valence, if not occupied by R or X, being occupied by a hydrogen atom.

The following examples illustrate the method for the preparation of several of the reaction products of this invention.

Example I 102.9 gms. of monoamyltrichlorosilane was added to 59.1 gms. of ethyl lactate at room temperature. A reaction started slowly, and a small quantity of solid material was formed throughout the mixture. The mixture was then heated at 100° C. for about six hours, and the clear solution which formed a part of the mixture gradually turned to a brown color. During the reaction, hydrogen chloride gas was evolved, but the amount thereof did not equal the theoretical quantity, probably due to a readdition of the hydrogen chloride to dehydrated ethyl lactate contained in the reaction mixture. After the completion of the reaction, the mixture was cooled, diluted with toluene, and then heated in contact with an excess of sodium bicarbonate until the mixture was neutral. The solution was then filtered to remove the excess sodium bicarbonate and the sodium chloride, and was then heated to 230° C. to remove the toluene and lower-boiling products. There remained in the reaction flask 55 gms. of a tacky, semi-solid polymer which was a useful plasticizer for nitrocellulose and which, when dissolved in toluene, formed a useful baking finish.

Example II 65 gms. of diamyldiethoxysilane and 51.5 gms. of diethyltartrate were placed in a flask and heated together for two hours, the vapor temperature being kept below 110° C. by means of a reflux condenser. Before the mixture was heated, the two reactants were immiscible; after the reactants had been heated for two hours, however, the theoretical quantity (23 gms.) of ethyl alcohol was distilled off, leaving a uniform mixture. The hot reaction mixture was then subjected to reduced pressure to remove residual low boiling materials, leaving in the reaction flask the theoretical amount (95 gms.) of a viscous, homogeneous product having a density at 29° C. of 1.0543 gms. per cc. and an $n_D$ at 29° C. of 1.4490. This product was a useful plasticizer for nitrocellulose and was useful as a baking finish when dissolved in toluene.

Example III 65 gms. of diamyldiethoxysilane and 59 gms. of ethyl lactate were heated together for about 24 hours. During this time the liquid temperature was held below 160° C. and the vapor pressure was kept below 110° C. by means of a reflux condenser. At the end of the heating time, 18 gms. of ethyl alcohol (75% of the theoretical amount) was distilled off, leaving 106 gms. of a clear, homogeneous liquid which was somewhat brown in color. This liquid had a density at 24.5° C. of 0.9542 gm. per cc. and an $n_D$ at 24.5° C. of 1.4230. This reaction product was a useful plasticizer for nitrocellulose and ethylcellulose and was a useful ingredient in baking finishes.

The foregoing examples illustrate the method of this invention for the preparation of reaction products of alkyl esters of lactic or tartaric acid and various organosilicon compounds by contacting at reaction temperatures the ester and an organosilicon compound having two or three replaceable halogen or alkoxy groups attached directly to the silicon atom. The reaction between the halogen-substituted silane and the ester is a condensation with the loss of hydrogen halide, while the reaction between the alkoxy-substituted silane and the ester is a condensation with the loss of alcohol. Depending upon the particular vapor pressure characteristics of the organosilicon compound employed as a reactant, the reaction may be carried out at atmospheric pressure, as is shown in the examples, or at superatmospheric pressure when it is desired to limit the escape of an organosilicon compound of high vapor pressure from the reaction zone before the reaction has been completed. Furthermore, depending upon the particular organosilicon compound selected, the reaction may initiate spontaneously, or it may be initiated by means of mild heating, as is shown in the examples.

For the organosilicon compounds used as a reactant in the examples, there may be substituted any compound of the class $R_ySiX_z$, in which R is an alkyl radical, X is a halogen (e. g., fluorine, chlorine, or bromine) or an OR' group (R' being an alkyl radical), $y$ is one or two, and $z$ is two or three, the remainder of the four silicon valences, if any, being occupied by hydrogen. Thus, among the organosilicon compounds which may suitably be employed as a reactant are n-amyl dichlorosilicane, n-amyl dimethoxysilicane, n-amyl trichlorosilicane, di-n-amyl di-chlorsilicane, n-amyl tri-ethoxy silicane, methyl trifluosilane, dimethyl difluorosilane, ethyl tribromosilane, diethyl dibromosilane, n-propyl tri-n-butoxysilane, di-n-propyl di-n-butoxysilane, etc. Preferably, R is an alkyl group having from one to five carbon atoms, such as the methyl, ethyl, n-propyl, i-propyl, n-butyl, n-amyl, etc. radicals, and R' is the methyl or ethyl group. Preferably, also, 0.3–3.0 equivalents of the organosilicon compound are employed per equivalent of the ester, based upon the hydroxyl content thereof.

Any neutral alkyl ester of lactic or tartaric acid may be substituted for the ethyl lactate and diethyl tartrate employed in the examples. Hence, there may be suitably used methyl lactate, dimethyl tartrate, n-propyl lactate, di-n-propyl tartrate, i-propyl lactate, di-i-propyl tartrate, n-amyl lactate, di-n-amyl tartrate, lauryl lactate, di-lauryl tartrate, etc. It is preferred, to use as a reactant the methyl and ethyl esters of lactic and tartaric acids because of their availability.

Depending upon the particular reactants selected and upon their relative proportions, and also upon the extent to which the reaction is carried towards completion, the products of this invention are liquids of varying viscosity or semi-solid materials. These materials are completely compatible with cellulose derivatives, such as nitrocellulose and ethylcellulose, and are useful plasticizers for those film-formers. The reaction products of this invention are also useful ingredients in baking finishes, either when used alone dissolved in an organic solvent, or in admixture with other known film-formers.

This application is a continuation-in-part of my application Serial No. 337,833, filed May 29, 1940, now abandoned, and entitled "Silicon compounds and method of making the same."

I claim:

1. A condensation product of a neutral alkyl ester of a material selected from the group consisting of tartaric acid and lactic acid and 0.3 to 3.0 equivalents per equivalent of ester, based upon the hydroxyl content thereof, of an organosilicon compound of the class $R_ySiX_z$, in which R is an alkyl radical, X is a radical selected from the group consisting of halides and alkoxy radicals, $y$ is an integer from one to two, and $z$ is an integer from two to three, the fourth silicon valence, if not occupied by R or X, being occupied by hydrogen.

2. A condensation product of a neutral alkyl ester of a material selected from the group consisting of tartaric acid and lactic acid and 0.3 to 3.0 equivalents per equivalent of ester, based upon the hydroxyl content thereof, of an organosilicon compound of the class $R_2SiX_2$, in which R is an alkyl radical and X is a halogen atom.

3. A condensation product of a neutral alkyl ester of a material selected from the group consisting of tartaric acid and lactic acid and 0.3 to 3.0 equivalents per equivalent of ester, based upon the hydroxyl content thereof, of an organosilicon compound of the class $R_2SiX_2$, in which R is an alkyl radical and X is an alkoxy radical.

4. A condensation product of a neutral alkyl ester of a material selected from the group consisting of tartaric acid and lactic acid and 0.3 to 3.0 equivalents per equivalent of ester, based upon the hydroxyl content thereof, of an organosilicon compound of the class $R_2SiX_2$, in which R is an alkyl radical having from one to five carbon atoms and X is a halogen atom.

5. A condensation product of ethyl lactate and 0.3 to 3.0 equivalents per equivalent of ester based upon the hydroxyl content thereof, of an organosilicon compound of the class $R_2SiX_2$, in which R is an alkyl radical having from one to five carbon atoms and X is an alkoxy radical having from one to two carbon atoms.

6. A condensation product of ethyl lactate and 0.3 to 3.0 equivalents per equivalent of ester based upon the hydroxyl content thereof, of an organosilicon compound of the class $RSiX_3$, in which R is an alkyl radical having from one to five carbon atoms and X is an alkoxy radical having from one to two carbon atoms.

7. A condensation product of ethyl lactate and 0.3 to 3.0 equivalents per equivalent of ester based upon the hydroxyl content thereof, of an organosilicon compound of the class $R_2SiCl_2$, in which R is an alkyl radical having from one to five carbon atoms.

8. The method of preparing a reaction product of an alkyl ester of tartaric acid or lactic acid and an organosilicon compound of the class $R_ySiX_z$, which comprises condensing a neutral alkyl ester of a material selected from the group consisting of tartaric acid and lactic acid and 0.3 to 3.0 equivalents per equivalent of ester, based upon the hydroxyl content thereof, of an organosilicon compound of the class $R_ySiX_z$, in which R is an alkyl radical, X is a radical selected from the group consisting of halides and alkoxy radicals, $y$ is an integer from one to two, and $z$ is an integer from two to three, the fourth silicon valence, if not occupied by R or X, being occupied by hydrogen.

FRANK J. SOWA.

REFERENCES CITED

The following references are of record in the file of this patent:

FOREIGN PATENTS

| Number | Country | Date |
|---|---|---|
| 641,075 | Germany | Jan. 21, 1937 |

OTHER REFERENCES

Post et al., J. Org. Chem., vol. 4, pp. 366 to 364, 1939.

Melzer: Berichte Deut. Chem. Gesil., vol. 41, pp. 3390–3395, 1908.

Post et al.: J. Org. Chem., vol. 4, pp. 363–364, 1939.